United States Patent [19]

Sproul

[11] 4,362,525
[45] Dec. 7, 1982

[54] BELT TENSIONER CONSTRUCTION
[75] Inventor: Nolte V. Sproul, Canton, Ohio
[73] Assignee: Dyneer Corporation, Canton, Ohio
[21] Appl. No.: 176,454
[22] Filed: Aug. 8, 1980
[51] Int. Cl.[3] .............................................. F16H 7/08
[52] U.S. Cl. ...................................... 474/117; 74/15; 74/89.22
[58] Field of Search ............... 474/117, 115, 133, 135, 474/134, 138, 111, 110; 74/15, 63, 89.2, 89.22

[56] References Cited

U.S. PATENT DOCUMENTS

| | | | |
|---|---|---|---|
| 1,789,571 | 1/1931 | Wanamaker | 474/117 X |
| 2,051,488 | 8/1936 | Kottlowski | 474/110 |
| 2,703,019 | 3/1955 | Burawoy | 474/110 |
| 3,057,218 | 10/1962 | Knerr | 474/115 X |
| 3,413,866 | 12/1968 | Ford | 474/138 |
| 3,631,734 | 1/1972 | Wagner | 474/117 |
| 3,710,634 | 1/1973 | Tamaru | 474/111 |
| 3,811,333 | 5/1974 | Castarede | 474/135 |
| 3,812,733 | 5/1974 | Yoshida | 474/111 |
| 3,950,046 | 4/1976 | Lubbersmeyer | 474/135 X |
| 3,975,965 | 8/1976 | Speer | 474/135 |
| 4,077,272 | 3/1978 | Busso | 474/135 X |
| 4,108,013 | 8/1978 | Sragal | 474/135 |
| 4,144,772 | 3/1979 | Brackin | 474/135 |
| 4,298,342 | 11/1981 | Clayton | 474/133 X |

Primary Examiner—Nile C. Byers, Jr.
Attorney, Agent, or Firm—Frease & Bishop

[57] ABSTRACT

A belt tensioning device for an endless drive belt for a vehicle accessories drive system. A sheet metal bracket is adapted to be mounted on an engine in a stationary position adjacent the drive belt and has a lever plate pivotally mounted thereon. An idler pulley is rotatably mounted on the lever plate and is movable into belt tensioning engagement by coil springs mounted on the bracket and engaged with the lever plate. A pair of pockets is formed in the bracket, each of which has an inclined surface which extends upwardly toward the lever plate. A camming block formed of a friction material is movably mounted in each pocket. Each block has an angled surface which is slidably engaged with the inclined surface of the pocket and has a planar coupling surface which frictionally engages the lever plate. The friction blocks provide a damping force on the lever plate when the lever plate attempts to move in the nonbelt tensioning direction. Coil springs are mounted in the pockets and exert a biasing force against the camming blocks to move the blocks along the inclined surfaces of the pockets and into engagement with the lever plate. The springs maintain a predetermined coupling force between the blocks and lever plate throughout the life of the camming blocks and drive belt.

10 Claims, 12 Drawing Figures

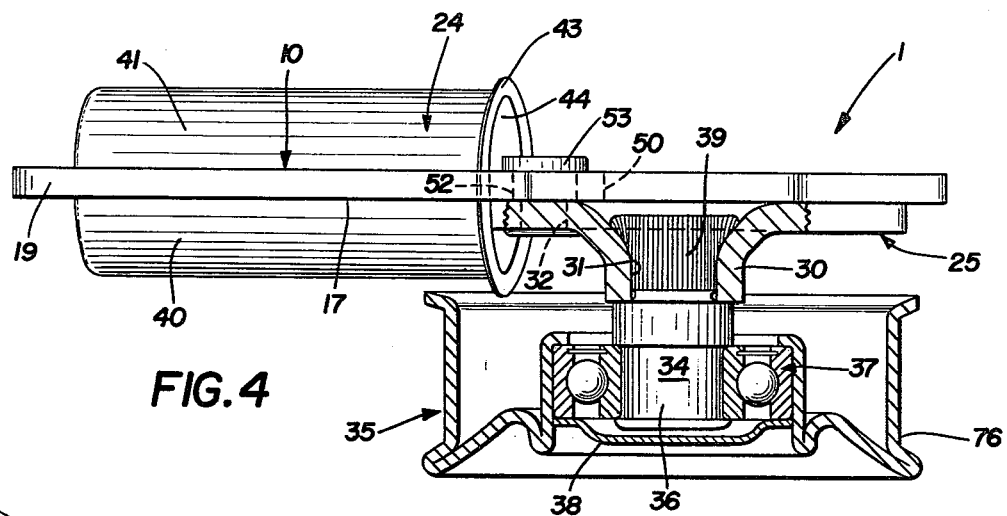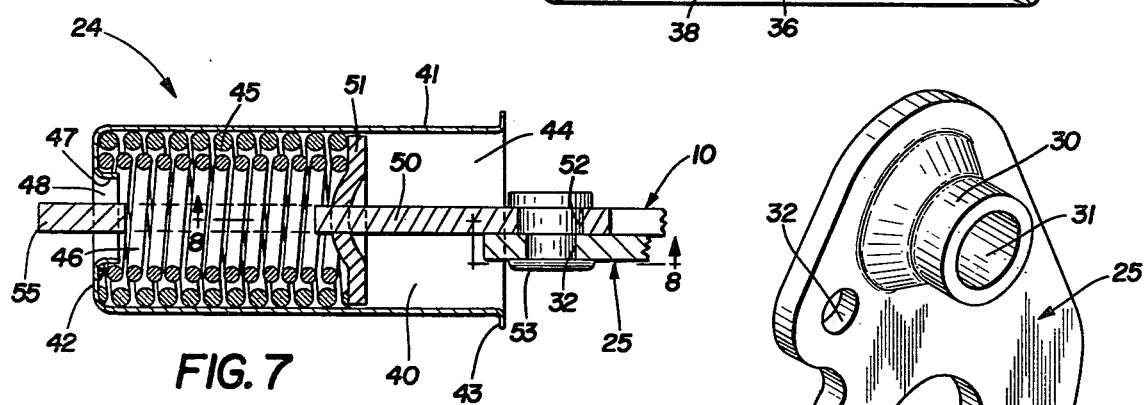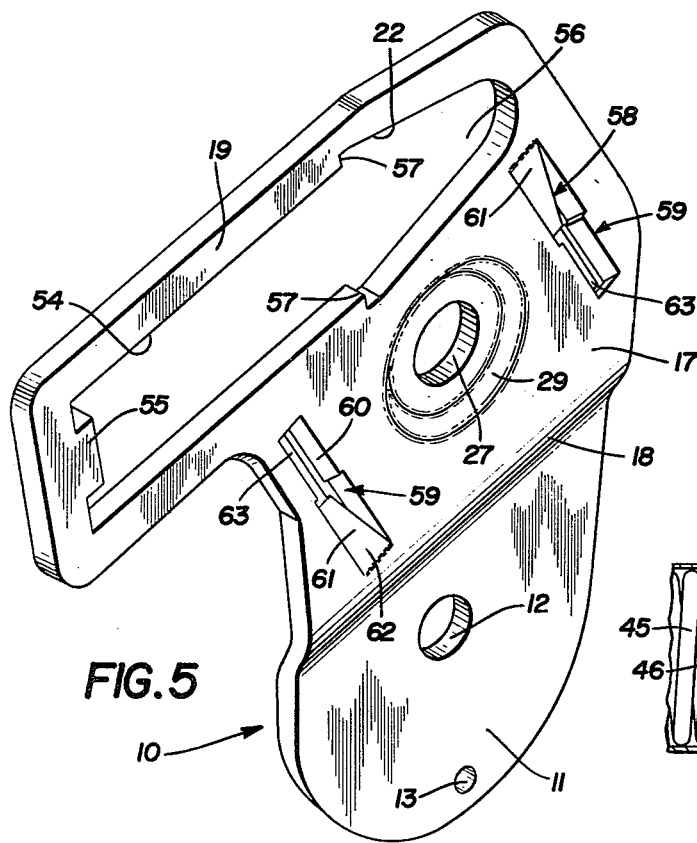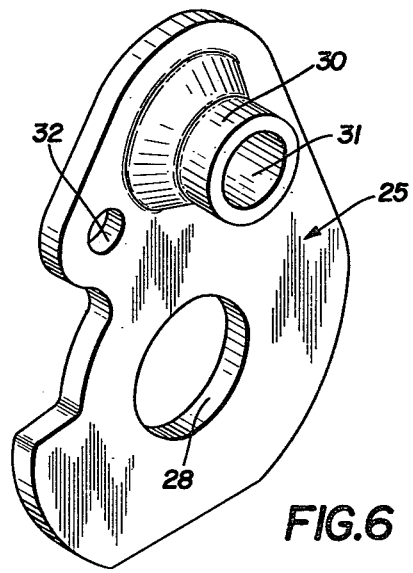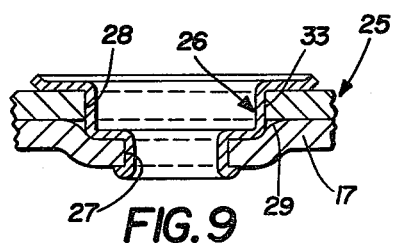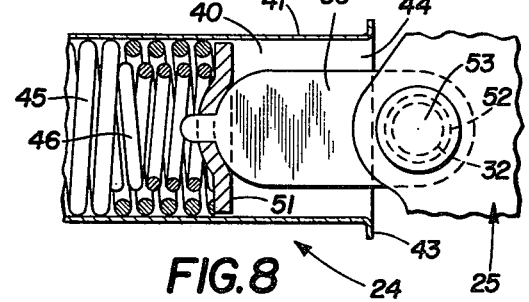

BELT TENSIONER CONSTRUCTION

BACKGROUND OF THE INVENTION

1. Field of the Invention

The invention relates to belt tensioning devices and arrangements, and in particular to a spring-actuated belt tensioner for use with an endless belt of a vehicle accessories drive system. More particularly, the invention relates to an improved, inexpensive belt tensioner construction having a unique damping mechanism, which provides a constant damping force against movement of the belt-engaging pulley in an opposite nontensioning direction by a spring-biased friction cam block arrangement.

2. Description of the Prior Art

There is the trend today in the automobile industry to operate the various vehicle accessories, such as the power steering pump, oil and air pumps, air conditioning and alternator, by a single endless belt driven by a pulley connected to the engine crankshaft. This system is referred to as a "serpentine" drive belt system. To ensure optimum operating efficiency for these various accessories, it is necessary that the drive belt be maintained at a predetermined tension to assure efficient performance of the accessories as well as satisfactory service life for the belt. Due to the relatively greater length for the single drive belt which replaces the heretofore plurality of smaller belts, there is a greater tendency for the belt to stretch which will affect the operating characteristics of the driven accessories. Therefore, it is desirable that a belt tensioning device be used for these endless belts to provide reliable service over an extended period of time and to maintain a constant amount of tension thereon regardless of the amount of belt stretch.

Numerous devices have been proposed and used to accomplish this purpose. One type of tensioner uses a bushing formed of an elastomeric material which is placed in compression by some mechanical means for continuously exerting a tensioning force on the belt. Examples of these constructions are shown in U.S. Pat. Nos. 3,975,965 and 4,144,772. These tensioner constructions, which use an elastomeric material, have the disadvantages in that the high load rate which they exert on the belt results in the rapid loss of tensioning as the belt stretches, and this load rate limits the stroke of the belt-engaged idler pulley to a shorter distance than desired. Also, sudden acceleration and deceleration and peak load frequencies at various points in the drive train primarily at low speeds can cause a belt surge and a whipping action to occur which creates a time lag before full damping is achieved.

Numerous other types of belt tensioning devices use coil springs which are either in compression or tension, for applying and maintaining the tensioning force on a belt-engaging idler pulley or chain-engaging sprocket. Some examples of these types of constructions are shown in U.S. Pat. Nos. 2,703,019, 3,413,866, 3,483,763, 3,631,734, 3,768,324, 3,812,733, 3,924,483, 3,965,768 and 4,108,013. Some coil spring-actuated devices use the biasing force of a spring in combination with hydraulic-actuated members for regulating the amount of tensioning force applied to the belt and for achieving a damping effect. Examples of these combination spring and hydraulic-actuated belt tensioners are shown in U.S. Pat. Nos. 2,051,488, 3,142,193 and 4,077,272.

It is desirable that a belt tensioner be provided with some type of damping means to prevent excessive oscillation from occurring in the spring tensioning member, and which will absorb sudden shocks to prevent a whipping action from occurring in the tensioner and drive belt. This damping action is especially critical when a coil spring is used for applying the belt tensioning force since coil springs are highly susceptible to developing natural oscillating frequencies when the counter force, which is exerted thereon by the belt, fluctuates during acceleration and deceleration of the vehicle. Such oscillating action affects the efficiency of the tensioning force applied to the belt by the coil spring and reduces belt life.

Various damping devices have been used with belt tensioners to eliminate or reduce this problem of coil spring oscillation. One type of construction uses a hydraulic fluid as the damping means, such as shown in U.S. Pat. Nos. 2,893,255, 3,964,311, 3,986,407 and British Pat. No. 336,737. U.S. Pat. No. 3,710,634 shows a belt tensioner which uses an eccentrically mounted mechanical pinion and rack arrangement which is spring biased by a leaf spring for absorbing an excessive amount of shock as opposed to providing a damping action for a spring-biased belt tensioning plunger.

Various belt tensioning devices also are provided with some type of mechanical retaining means which limits the movement of the belt tensioning member in a direction opposite to the tensioning direction, thereby assisting the tensioning member to maintain a constant tensioning force on the endless drive belt by retaining the member in its forwardmost belt tensioning position. Many of these known retaining arrangements use a spring-biased mechanical detent-ratchet retaining means. Examples of these prior constructions and arrangements are shown in U.S. Pat. Nos. 2,051,488, 2,703,019, 3,413,866, 3,631,734 and 3,812,733.

It also is highly desirable when developing a belt tensioner intended primarily for use on an automobile to devise a construction which can be produced as inexpensively as possible without sacrificing durability and efficiency since a savings of only a part of a dollar would amount to a sufficient overall savings when considering the millions of vehicles that are produced by the various vehicle manufacturers.

Many of these problems have been eliminated by the belt tensioner shown in earlier U.S. Pat. No. 4,299,584. This construction provides an inexpensive tensioner which has a damping mechanism incorporated therein which eliminates many of the above-discussed problems. This damping mechanism has a leaf spring which is mounted on either the engine mounting bracket or pulley lever and selectively engages a series of ratchet teeth formed on the opposite member. However, this leaf spring-ratchet teeth arrangement enables the lever plate to be adjusted in stepped intervals as the belt stretches. The distance between intervals is determined by the spacing between adjacent ratchet teeth. Occasionally, this may result in a less efficient operation than desired.

Therefore, the need has existed for such a belt tensioner having an improved damping arrangement which, in addition to the features discussed above, provides damping regardless of the position of the idler pulley and its mounting bracket with respect to the stationary engine mounting bracket as the belt stretches, which is not believed to be reliably achieved by any of the prior belt tensioning devices.

SUMMARY OF THE INVENTION

Objectives of the invention include providing an improved device for tensioning the drive belt for vehicle accessories which maintains a generally constant, predetermined tensioning force on the belt throughout the life of the belt regardless of whether the engine is on or off or operating at various speeds and conditions; providing such a belt tensioner which is of an extremely inexpensive design formed of several sheet metal components which can be mass-produced by simple metal stamping procedures, and then assembled with a usual pulley and compression spring; providing such a belt tensioner which has a unique damping mechanism mounted thereon which retards movement of the belt-engaging pulley in a nontensioning direction; providing such a belt tensioning device in which the mounting bracket portion can be constructed so as to be attached directly to the engine block, thereby eliminating an additional engine mounting bracket component heretofore required for mounting prior tensioning devices on the engine blocks, eliminating an additional component and resulting in a savings in material cost and weight; providing such a belt tensioning device in which the damping is achieved by inexpensive blocks of friction material which are movably mounted in pockets stamped in the engine mounting bracket and which are spring biased into frictional engagement with the lever plate on which the belt tensioning pulley is mounted to maintain a constant wedging force on the friction blocks; providing such a belt tensioner in which ramps are formed in the friction block receiving pockets along which the friction blocks are moved by their compression springs; providing such a belt tensioner in which the improved damping feature can be incorporated into a tensioning mechanism which tensions a drive belt by pivotal movement of one of the vehicle accessories in order to provide alternate tensioning arrangements if desired by a particular vehicle manufacturer; providing such a belt tensioner having a damping mechanism which provides infinite positioning of the damping mechanism regardless of the position of the pulley and amount of belt stretch; and providing such an improved belt tensioner construction which achieves the stated objectives in a simple, effective, rugged and relatively inexpensive manner, and which solves problems and satisfies needs existing in the art.

These objectives and advantages are obtained by the improved belt tensioner construction for tensioning an endless drive belt for vehicle engine accessories, the general nature of which may be stated as including bracket means adapted to be mounted on a vehicle engine adjacent the drive belt; first spring means mounted on the bracket means; lever means pivotally mounted on the bracket means and biased by the first spring means in a belt tensioning direction; rotatable pulley means mounted on the lever means and movable into tensioning engagement with the drive belt upon pivotal movement of the lever means by the first spring means; and friction means operatively engageable with the bracket means and lever means to retard pivotal movement of the lever means in a direction opposite to the belt tensioning direction.

BRIEF DESCRIPTION OF THE DRAWINGS

A preferred embodiment of the invention—illustrative of the best mode in which applicant has contemplated applying the principles—is set forth in the following description and shown in the accompanying drawings, and is particularly and distinctly pointed out and set forth in the appended claims.

FIG. 4 is a top plan view of the belt tensioner shown in FIG. 2, with the idler pulley being shown in section;

FIG. 5 is an enlarged perspective view of the mounting bracket component of the improved belt tensioner;

FIG. 6 is an enlarged perspective view of the lever plate component of the improved belt tensioner;

FIG. 7 is an enlarged fragmentary sectional view taken on line 7—7, FIG. 2;

FIG. 8 is an enlarged fragmentary sectional view taken on line 8—8, FIG. 7;

FIG. 9 is an enlarged fragmentary sectional view taken on line 9—9, FIG. 2;

Similar numerals refer to similar parts throughout the drawings.

DESCRIPTION OF THE PREFERRED EMBODIMENT

Figures 1, 10:
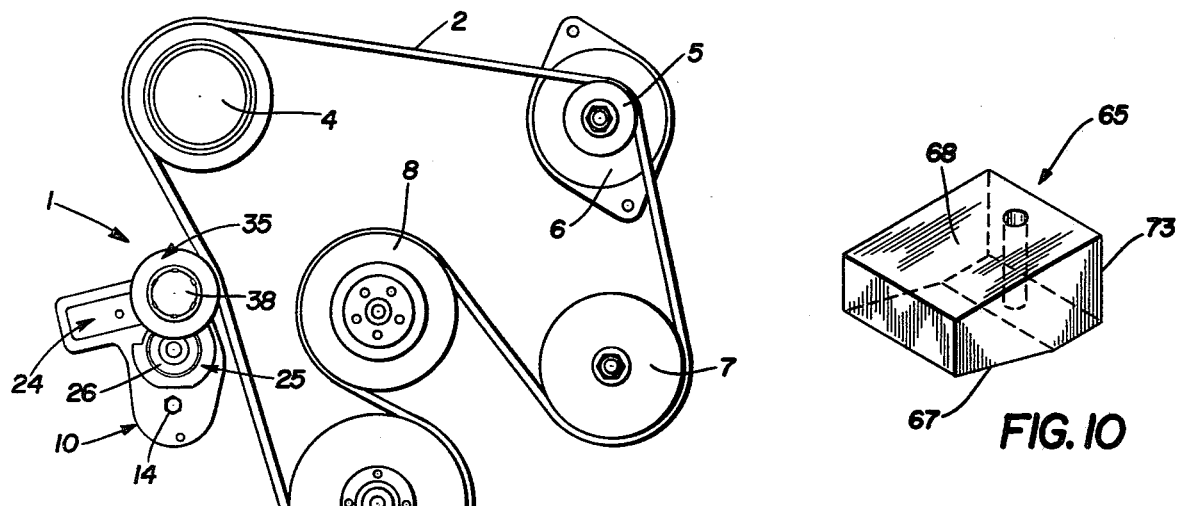
FIG. 1 is a diagrammatic view looking toward the front of an engine illustrating an endless drive belt drivingly engaged with the vehicle accessories and with the improved belt tensioner construction engaged with the drive belt.
FIG. 10 is an enlarged perspective view of one of the frictional cam blocks of the damping mechanism.

Referring to FIG. 1 of the drawings, the improved belt tensioner construction is indicated generally at 1, and is shown in tensioning engagement with an endless drive belt 2 of a power transmission belt drive system which is shown diagrammatically looking toward the front of an engine. The accessory drive system consists of a plurality of belt pulleys or sheaves having configurations and diameters determined by and associated with engine accessory components and their locations relative to each other. The various pulleys are supported on their respective engine components which in turn are mounted on an engine (not shown) in a usual manner known in the art. Belt 2 preferably operates in a single vertical plane to eliminate binding and skewing of the belt.

The particular engine accessories drive system shown in FIG. 1 consists of a main driving pulley 3 which is operatively connected to the main drive shaft of the engine, a pulley 4 which is operatively connected to the engine air pump, a pulley 5 which is operatively connected to an alternator 6 which provides electrical power for the engine, a pulley 7 which is operatively connected to the vehicle power steering unit, and a pulley 8 which is operatively connected to the engine water pump.

Figures 2, 3, 11, 12:
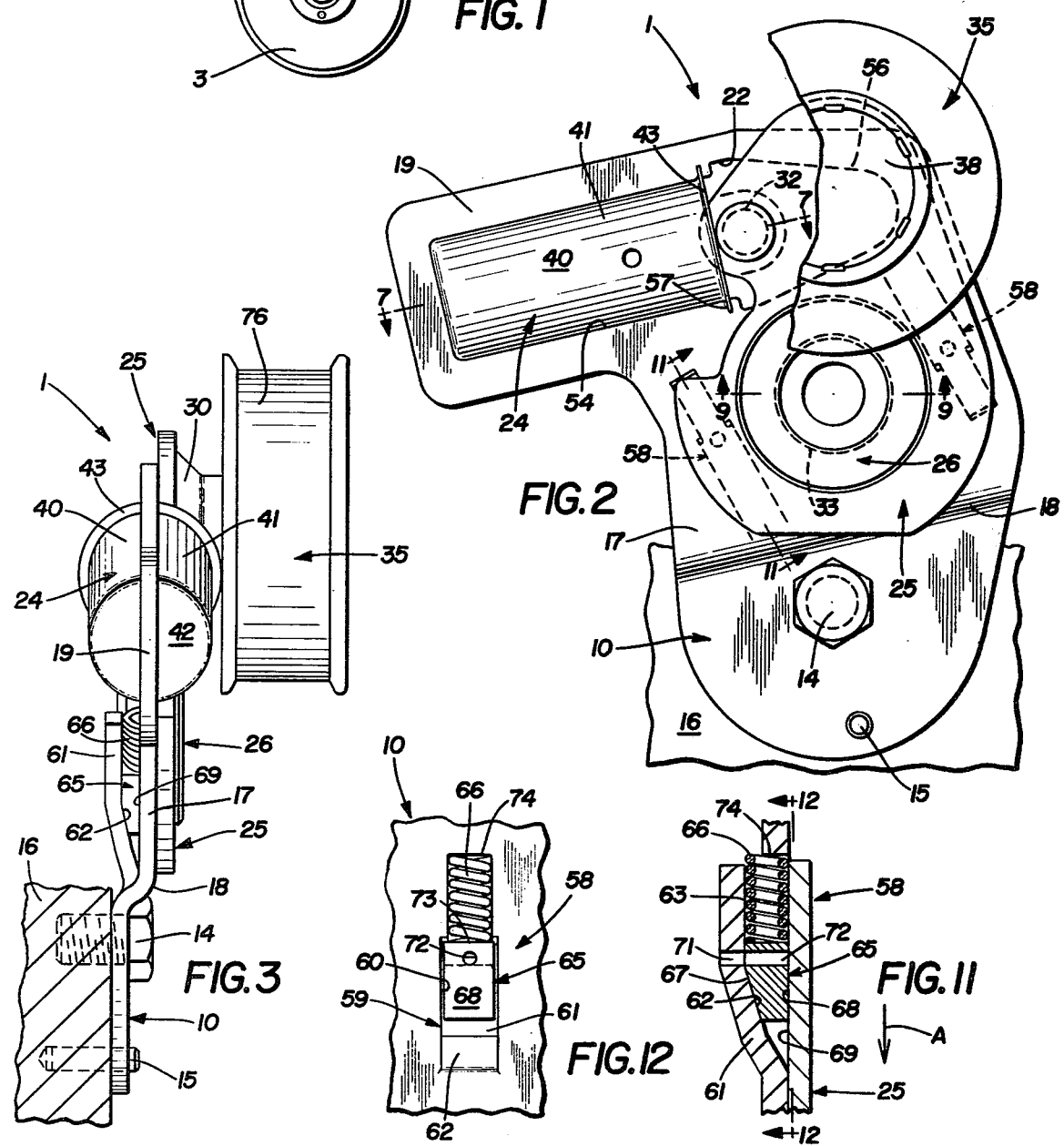
FIG. 2 is an enlarged front elevational view of the belt tensioner shown in FIG. 1 with portions broken away, showing the improved belt tensioner mounted on a portion of an engine with the drive belt removed therefrom.
FIG. 3 is a left-hand end view of the belt tensioner shown in FIG. 2 with the engine mounting bracket shown in section.
FIG. 11 is an enlarged fragmentary sectional view taken on line 11—11, FIG. 2.
FIG. 12 is a fragmentary sectional view taken on line 12—12, FIG. 11.

Improved belt tensioner 1 includes an engine mounting bracket indicated generally at 10 (FIG. 5), which is formed inexpensively of a one-piece, stamped sheet metal member. Bracket 10 includes a flat mounting flange portion 11 which is formed with a pair of holes 12 and 13 through which a blot 14 and alignment pin 15 extend for mounting tensioner 1 on an engine 16 (FIGS. 2 and 3).

Bracket 10 further includes a generally flat, central portion 17 which is located in a plane that is spaced outwardly from and extends generally parallel with the plane of mounting flange 11 and is connected to flange 11 by bend zone 18. Central bracket portion 17 terminates in an elongated spring mounting flange portion 19 which lies in the same plane as central portion 17 (FIGS. 3 and 5). Spring mounting portion 19 is formed with an elongated arrow-shaped opening 22 for receivably mounting therein a spring assembly, indicated generally at 24 (FIGS. 7 and 8).

A lever plate indicated generally at 25 (FIGS. 2, 3 and 6) is pivotally mounted on central bracket portion 17 by a pivot cup 26 (FIG. 9) which extends through aligned holes 27 and 28 formed in engine mounting bracket portion 17 and lever plate 25, respectively. An annular recess 29 is formed in bracket portion 17 and surrounds pivot hole 27 for receiving pivot cup 26 which provides a cylindrical bearing surface 33 for the pivotal movement of lever plate 25. Lever plate 25 also is an inexpensive one-piece, stamped sheet metal member as in bracket 10. Lever plate 25 is a flat, irregularly shaped member formed with pivot mounting hole 28, an outwardly extending boss 30 which surrounds and defines a shaft-receiving opening 31, and a smaller spring plunger mounting hole 32.

An idler pulley 35 is rotatably mounted on lever plate 25 by a bearing stub shaft 36 (FIG. 4). Shaft 36 has a splined end 39 which is press fitted within circular boss 30 and extends outwardly through shaft-receiving opening 31. Pulley 35 is rotatably mounted on a smooth outer end 34 of shaft 36 by a bearing ring 37 which is concealed behind a bearing cover plate 38.

Spring assembly 24 includes a cup-shaped housing 40 formed by a cylindrical wall 41 and an end wall 42. Cylindrical wall 41 terminates in a radially outwardly extending annular flange 43 which defines an open cup end 44. A pair of coil compression springs 45 and 46 having diameters generally complementary to the internal diameter of spring housing 40 are telescopically mounted within housing 40. Springs 45 and 46 abut against end wall 42 and surround an inwardly extending boss 47 which is formed in end wall 42 and defines an end wall opening 48.

A plunger 50 (FIGS. 7 and 8) operatively connects springs 45 and 46 with lever plate 25 to provide the tensioning force on belt 2 by pivotally moving pulley 35 in the belt tensioning direction (clockwise, FIG. 1). A washer 51 is mounted on the inner end of plunger 50 and is complementary to the internal diameter of spring housing 40 and is telescopically mounted therein and is in abutting engagement with springs 45 and 46. The outer end of plunger 50 is formed with a hole 52 for pivotally attaching plunger 50 to lever plate 25 by a rivet 53 which extends through lever plate hole 32 and plunger hole 52.

Spring assembly 24 is mounted within a rectangular-shaped portion 54 of the bracket opening 22 and is retained therein by a tab 55 which is formed on spring-mounting flange portion 19 which projects through opening 47 of housing end wall 42. Annular flange 43 of spring housing 40 engages shoulders 57 which connects opening portion 54 with the arrowhead-shaped opening portion 56. Plunger 50 extends outwardly through open cup end 44 into arrowhead-shaped opening portion 56 of mounting bracket opening 22.

In accordance with the invention, an improved damping mechanism is provided on belt tensioner 1 and is operatively engaged with stationary bracket 10 and lever plate 25. The improved damping mechanism is indicated generally at 58, and two such mechanisms are shown incorporated in belt tensioner 1. Since the two damping mechanisms of belt tensioner 1 are similar, only one is shown in the drawings and described in detail below.

Each mechanism 58 (FIGS. 2, 5, 11 and 12) includes a pocket 59 which is formed in central portion 17 of engine mounting bracket 10 during the metal stamping formation of bracket 10. Pocket 59 is defined by a generally rectangular-shaped opening 60 which is formed in central portion 17 of bracket 10 simultaneously with the stamping of a tab 61. Tab 61 has an inclined surface 62 which extends inwardly from central portion 17 and terminates in another surface 63 which is parallel with the planar surface of central bracket portion 17. Tab 61, together with the edges of opening 60 formed upon the stamping of tab 61, defines pocket 59 for mounting of the various components of damping mechanism 58 therein.

A camming block of frictional material, indicated generally at 65 (FIG. 10), is movably mounted within each pocket 59. Camming block 65 has a generally cubicle-shaped configuration and preferably is formed of a solid piece of frictional material. One particular type of material found suitable is sintered iron (SAE 855). Camming block 65 is seated in pocket 59 and is spring-biased by a compression coil spring 66 toward inclined surface 62 of pocket tab 61. Block 65 has an inclined surface 67 having an angle of inclination similar to that of inclined tab surface 62, whereby block surface 67 will slide along surface 62 under the biasing action of spring 66. Block 65 further includes a flat, planar, frictional coupling surface 68 located generally opposite inclined block surface 67. Block surface 68 frictionally engages the underside surface 69 of lever plate 25 to provide the damping action between lever plate 25 and mounting bracket 10. Inclined block surface 67 preferably forms an included acute angle of approximately 15° with frictional planar surface 68.

A pair of small holes 71 and 72 is formed in tab 61 and cam block 65, respectively, (FIGS. 10 and 11) for insertion of a tool during the installation of camming block 65 and spring 66 in pocket 59, and once these components are installed, holes 71 and 72 perform no function in the operation of improved damping mechanisms 58. Spring 66 is compressed between rear surface 73 of block 65 and edge 74 of mounting bracket 10, which edge is formed upon the shear forming of pocket tab 61. Calculations based upon the coefficient of friction of block 65, the angle of inclination of inclined tab surface 62, and the particular characteristics of coil spring 66, enable the desired amount of frictional coupling force to be exerted between block 65 and lever plate 25 to achieve the desired damping force.

The operation of improved belt tensioner construction 1 is shown generally in FIGS. 1 and 2 and is described briefly below. Tensioner 1 preferably is mounted directly on the vehicle engine block or on another engine bracket by bolt 14 and pin 15 at a selected location closely adjacent drive belt 2. Pulley 35 is moved manually in a counterclockwise direction with respect to its mounting location (FIG. 1), compressing coil springs 45 and 46 within cup-shaped housing 40. Belt 2 then is placed within a peripheral pulley groove 76 formed in pulley 35. After release of the manual restraining force on pulley 35, springs 45 and 46 bias pulley 35 in a clockwise belt tensioning direction to apply a predetermined tensioning force on belt 2.

Damping springs 66 will bias camming blocks 65 into a wedging relationship between inclined surfaces 62 of tabs 61 and the underside surface 69 of lever plate 25, as shown in FIG. 11.

When a sudden force or shock is applied to pulley 35 by belt 2, which may occur during the sudden acceleration or deceleration of the vehicle engine, lever plate 25 will attempt to move in a nontensioning direction (Arrow A, FIG. 11). The frictional engagement between block surfaces 68 and lever plate surface 69 will retard this movement of lever plate 25 in this nontensioning direction. This retarding action will eliminate or substantially reduce any belt whipping and belt oscillation movement. Some movement of lever plate 25 in the nontensioning direction will occur since there is no positive mechanical stop preventing such nontensioning movement. Also, as plate 25 attempts to move in the direction of Arrow A (FIG. 11), the frictional engagement between lever surface 69 and block surfaces 68 will cause a wedging action to occur therebetween due to blocks 65 attempting to move upwardly along inclined tab surfaces 62. This wedging action further reduces the possibility of any whipping or oscillatory motion from being imparted to lever plate 25, and correspondingly to pulley 35. Lever plate 25 will be returned to its forwardmost belt tensioning position by the action of the main tensioning force of coil springs 45 and 46 immediately after any nontensioning force is removed, compensating for any movement which may have occurred in the nontensioning direction between plate 25 and bracket 10.

Damping mechanism coil springs 66 ensure that camming blocks 65 are maintained in frictional engagement with lever plate surface 69 even after extended periods of use. As frictional surfaces 68 wear away on blocks 65, springs 66 will maintain surfaces 68 in the predetermined pressure contact with lever plate 25 due to the movement of blocks 65 upwardly along inclined tab surfaces 62. Thus, even should a large amount of frictional material or depth of surfaces 68 wear away, the predetermined frictional contact will be maintained, ensuring uniformity of operation of damping mechanism 58.

The continuous frictional force exerted by camming blocks 65 on lever plate 25 also prevent an oscillating frequency from developing in coil springs 45 and 46. Such undesirable oscillation can occur easily in those belt tensioners using coil springs for the main belt tensioning force due to the tendency of coil springs to develop oscillating frequencies.

In the particular embodiment shown in the drawings, two damping mechanisms 58 are operatively engaged between mounting plate 10 and lever plate 25. These mechanisms are located at diametrically opposite positions with respect to each other and with respect to lever plate pivot cup 26. This arrangement increases the efficiency of the damping action and provides for symmetrical damping forces being applied between bracket 10 and plate 25. In the event that camming blocks 65 become excessively worn, new blocks can be inserted in pockets 59 at an extremely low cost in both material and labor.

It is easily understood from the above description and drawings that the improved cam friction block damping mechanism can also be incorporated into a belt tensioning construction of the type wherein one of the vehicle accessories is mounted on a pivotally movable lever for tensioning the drive belt which is operatively engaged with the accessory pulley.

Accordingly, the improved belt tensioner construction provides an effective, safe and efficient device which can be formed relatively inexpensively of stamped sheet metal components, which has a unique damping ability provided by spring-biased cam friction blocks which operate completely independent of the main power source exerted by compression coil springs, and which provides a device which eliminates difficulties encountered with prior tensioning devices and arrangements and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved belt tensioner construction is constructed and used, the characteristics of the construction, and the advantageous, new and useful results obtained; the new and useful structures, devices, elements, arrangements, parts, and combinations, are set forth in the appended claims.

I claim:

1. A belt tensioner construction for tensioning an endless drive belt of a drive system for vehicle accessories, said tensioner construction including:
   (a) bracket means adapted to be mounted on a vehicle engine adjacent the drive belt;
   (b) first spring means mounted on the bracket means;
   (c) lever means pivotally mounted on the bracket means and biased by the first spring means in a belt tensioning direction;
   (d) rotatable pulley means mounted on the lever means and movable into tensioning engagement with the drive belt upon pivotal movement of the lever means by the first spring means;
   (e) friction means movably mounted between and operatively engageable with the bracket means and lever means for retarding pivotal movement of the lever means in a direction opposite to the belt tensioning direction;
   and
   (f) second spring means for biasing the friction means into operative engagement with the bracket means and lever means.

2. The tensioner construction defined in claim 1 in which the friction means includes a block of material at least one surface of which is of a frictional material; in which said block is mounted on the bracket means; and in which the frictional surface of said block is in sliding engagement with the lever means.

3. The tensioner construction defined in claim 2 in which pocket means is formed in the bracket means; in which the pocket means is provided with an inclined surface; in which the block of material is movably mounted in the pocket means; and in which the second spring means biases said block along the inclined surface of the pocket means, thereby maintaining a predetermined engagement force between the frictional surface of the block and the lever means to compensate for wear of the frictional surface.

4. The tensioner construction defined in claim 3 in which the block of frictional material has an inclined surface which is slidably engaged with the inclined surface of the pocket means; in which the frictional surface of said block has a planar configuration; and in which the inclined surface of the block forms an acute included angle with the planar frictional surface of said block.

5. The tensioner construction defined in claim 2 in which two blocks of material each having a frictional surface are mounted on the bracket means; and in which said blocks are located generally diametrically opposite of each other with respect to the pivotal mounting between the lever means and bracket means.

6. The tensioner construction defined in claim 2 in which the block of frictional material is formed of sintered iron.

7. The tensioner construction defined in claim 1 in which the bracket means has an engine-mounting flange at one end and a spring-mounting flange at the opposite end; in which the first spring means includes a cup-shaped housing and a pair of compression coil springs mounted in said housing, with said housing being mounted on the spring-mounting flange; and in which plunger means is pivotally mounted on the lever means and is operatively engaged by the coil springs which bias the plunger means and lever means in the belt tensioning direction.

8. The belt tensioner construction defined in claim 8 in which the spring-mounting flange is formed with an arrow-shaped opening; in which the cup-shaped spring housing terminates at one end in a radially outwardly extending annular flange and at an opposite end in a central opening; in which the spring housing is removably mounted in the opening of the spring-mounting flange with the housing flange engaging a shoulder formed on the spring-mounting flange; and in which a tab is formed on the spring-mounting flange and extends into the central opening of the spring housing to mount said spring housing in said opening.

9. The belt tensioner construction defined in claim 1 in which the bracket means and lever means are each one-piece metal plates.

10. A belt tensioner construction for tensioning an endless drive belt of a drive system for vehicle accessories, said tensioner construction including:
  (a) bracket means adapted to be mounted on a vehicle engine adjacent the drive belt, said bracket means having an engine-mounting flange at one end and a spring-mounting flange at the opposite end;
  (b) first spring means mounted on the bracket means, said first spring means having a cup-shaped housing and a pair of compression coil springs mounted in the housing with said housing being mounted on the spring-mounting flange of the bracket means;
  (c) lever means pivotally mounted on the bracket means and biased by the first spring means in a belt tensioning direction;
  (d) rotatable pulley means mounted on the lever means and movable into tensioning engagement with the drive belt upon pivotal movement of the lever means by the first spring means;
  (e) friction means operatively engageable between the bracket means and lever means to retard pivotal movement of the lever means in a direction opposite to the belt tensioning direction; and
  (f) plunger means pivotally mounted on the lever means and operatively engaged by the coil springs which bias the plunger means and lever means in the belt tensioning direction.

* * * * *